US004001600B2

United States Statutory Invention Registration [19]

[11] Reg. Number: H1600

Imfeld et al.

[45] Published: Oct. 1, 1996

[54] HIGH DENSITY POLYETHYLENES WITH IMPROVED PROCESSING STABILITY

[75] Inventors: Stephen M. Imfeld, Mason; Daryl L. Stein, West Chester, both of Ohio

[73] Assignee: Quantum Chemical Company, Cincinnati, Ohio

[21] Appl. No.: 410,994

[22] Filed: Mar. 27, 1995

[51] Int. Cl.[6] ..... C08L 23/08; C08L 23/04

[52] U.S. Cl. ..... 524/415; 524/91; 524/99; 524/100; 524/102; 524/117; 524/119

[58] Field of Search ..... 524/91, 99, 102, 524/100, 117, 119, 415

[56] References Cited

U.S. PATENT DOCUMENTS

| | | | |
|---|---|---|---|
| 3,642,749 | 2/1972 | Johnson et al. . | |
| 3,644,323 | 2/1972 | Norwood et al. . | |
| 3,652,214 | 3/1972 | Aboutboul et al. . | |
| 3,704,287 | 11/1972 | Johnson . | |
| 3,985,676 | 10/1976 | Rekers et al. . | |
| 4,192,156 | 3/1990 | Yagi et al. . | |
| 4,318,845 | 3/1982 | Spivack et al. | 524/91 |
| 4,374,219 | 2/1983 | Spivack et al. . | |
| 4,981,927 | 1/1991 | Rekers et al. | 526/105 |
| 5,346,944 | 9/1994 | Hayashida et al. . | |

OTHER PUBLICATIONS

*Plastics Additives Handbook,* 2nd edition, R. Gachter and H. Muller; pp. 33–39 (1987).

Johnston, R. T., et al.: *Polymer Preprints,* "Temperature Dependence of Thermo–oxidative Crosslinking and Degradation of Polyethylene During Melt Processing," pp. 121–122 (1992).

Orgando, J., *Plastics Technology,* "Additives for Recycling," pp. 56–60 (Jul. 1993).

Mitterhofer, F.: *Sci. & Tech. of Polymer Processing,* Proceedings of the International Conference on Polymer Processing, pp. 809–827 (Aug. 1977); MIT Press; Cambridge, Mass.

Mitterhofer, F.: *Polymer Eng. & Sci.,* "Processing Stability of Polyolefins" vol. 20, No. 10, pp. 692–695 (Jul. 1980).

Mitterhofer, F.: *Kunstsoffe,* "Verarbeitungs–Stabilisatoren fur Polyathylen," German lang. text 67 (1977) 11, pp. 684–687.

(List continued on next page.)

*Primary Examiner*—Charles T. Jordan
*Assistant Examiner*—John R. Hardee
*Attorney, Agent, or Firm*—Gerald A. Baracka; William A. Heidrich

[57] ABSTRACT

Phillips' process high density polyethylene resin compositions having improved processing stability are obtained using a combination of stabilizers comprised of a hindered phenol and a phosphite compound having three cyclic phosphite moieties linked via a nitrogen atom. More specifically, the phosphite compound is 2, [[2,4,8,10-tetrakis(1,1-dimethylethyl)dibenzo[d,f][1,3,2]-dioxaphosphepin-6-yl]oxy]-N,N-bis [2-[[2,4,8,10-tetrakis (1,1-dimethylethyl) dibenzo[d,f][1,3,2]dioxaphosphenpin-6-yl]oxy] -ethyl]ethanamine. With the HDPE compositions stabilized in accordance with the invention, it is possible to eliminate undesirable rapid changes in melt viscosity which can occur when Phillips' process HDPE resins are processed under conditions of high shear.

19 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Laermer, S. F., et al.: *Journal of Plastic Film & Sheeting,* "Alpha–Tocopherol (Vitamin E)—The Natural Antioxidant for Polyolefins," vol. 8, pp. 228–248, (Jul. 1992).

Rothstein, E.: *Journal of Applied Poly. Sci.,* "Stabilization of High–Density Polyethylene" vol. 12, pp. 1279–1295 (1968), John Wiley & Sons, Inc.

Lemmen, T., et al.: ANTEC '90, "Balanced Performance of a Novel Phosphite," pp. 1186–1190.

Ciba–Geigy Corp. publication A–7413M25 (1995): "IRGANOXY LC Blends, A New Generation of Stabilizer Systems for Color Critical Applications" (16 text pages).

Stinson, S.: *C&EN*: "New Antioxidant has Improved Properties," p. 35 (Oct. 1994).

Bussone, D.: *Modern Plastics,* "High–density polyethylene," p. 54, 75 (Mid–Oct. Encyclopedia Issue).

*Chemical Marketing Reporter*, "Ciba Geigy Launching New Stabilizer," p. 5 (Aug. 22, 1994).

HIGH DENSITY POLYETHYLENES WITH IMPROVED PROCESSING STABILITY

BACKGROUND OF THE INVENTION

1. Field of the Invention

This invention relates to high density polyethylene resins having improved processing stability.

2. Description of the Prior Art

High density polyethylene (HDPE) is a well-known and highly useful thermoplastic resin recognized for its excellent physical properties and chemical resistance. HDPEs are linear homopolymers and copolymers of ethylene having densities in the range 0.94 to 0.965 g/cc. Molecular weights typically range from about 50,000 up to about 500,000; however, resins with molecular weights up to several million, referred to as ultra high molecular weight HDPEs, have been produced.

The ability to vary the density, molecular weight and molecular weight distribution of HDPE resins makes them a highly versatile material suitable for use in a wide variety of diverse applications. For example, HDPEs can be used for extrusion and powder coating, to produce blown or cast films, for rotational molding and rotational lining, for injection molding, and for blow molding.

Because polyolefins are susceptible to oxidation at various stages in the life cycle of the resin, i.e., during manufacture, processing and end use, antioxidants are needed to protect against the deleterious effects of oxygen and temperature and preserve the inherent properties of the resin. Primary stabilization is generally achieved by incorporating one or more sterically hindered phenols which function as radical scavengers in the resin. Secondary antioxidants, or processing stabilizers as they are often called, are also often required. The secondary antioxidants provide a complementary protection mechanism against peroxides and hydroperoxides that would otherwise react in a detrimental way with the resin and produce undesirable changes in melt viscosity and color formation. Phosphorus compounds, e.g., phosphites and phosphonites, are commonly used as secondary antioxidants with sterically hindered phenols for the stabilization of polyolefins.

Chain scission and chain extension, i.e., crosslinking, occur simultaneously during HDPE processing depending on the availability of oxygen, type and amount of catalyst residue, and processing conditions. Polymer type also plays a significant role when considering changes which can occur during processing. Phillips' process HDPEs have significantly higher terminal vinyl unsaturation content than Ziegler-Natta resins and, therefore, are notably more prone to increases in melt viscosity (reduction in melt index) and formation of insoluble gel particles due to chain extension during processing. The presence of these insoluble polymer molecules can lead to the formation of undesirable defects, including "black specks," in films or blow molded articles produced from the resin.

While proper choice of the secondary antioxidant is essential if the aforementioned processing problems are to be avoided, selection is complicated in that processing stabilizers exhibit different degrees of effectiveness for HDPEs produced by the different processes. To illustrate this point, reference may be made to the table provided at page 33 of *Plastics Additives,* 2nd edition, R. Gächter and H. M üller (1987) ranking the relative effectiveness of various antioxidants for Ziegler and Phillips resins.

Various phosphites and phosphonites have been evaluated as secondary antioxidants for HDPE and the results are reported in the literature. In a study conducted by F. Mitterhofer and reported at pp. 809–826 in *Science and Technology of Polymer Processing,* Proceedings of the International Conference on Polymer Processing held at The Massachusetts Institute of Technology, Cambridge, Mass., August, 1977, the author compared the effectiveness of distearyl-pentaerythritol-diphosphite (P-1) and tetrakis (2,4-di- tert.butylphenyl)4,4'-biphenylenediphosphonite (PEPQ) in Phillips' process HDPE. By measuring the melt index change during prolonged residence in a melt index apparatus, it was concluded that only PEPQ at higher concentrations (2500 ppm) gave no change in melt flow. In all instances when PEPQ was used at lower concentrations with a hindered phenol, a lowering of melt index was observed - the extent of the reduction varying with the weight ratio of PEPQ to hindered phenol. A later article published by the same author (*Polymer Eng. & Sci.,* mid-July, 1980, Vol. 20, No. 10, pp. 692–695) reported results evaluating PEPQ in a low melt index Phillips' process HDPE resin using a Brabender plastograph and noting the time to the onset of crosslinking, i.e., a marked increase in torque. Procedures of this type using torque rheometers provide a more rigorous test, i.e., higher shear rates, than can be achieved with the melt index apparatus and are generally considered to give good correlation with actual processing conditions. At best, under these more rigorous test conditions with PEPQ, it was only possible to delay the onset of crosslinking.

It would be highly advantageous if the significant torque rise heretofore observed during processing of Phillips process HDPE in torque rheometers, and attributable to the onset of undesirable levels of crosslinking, could be eliminated. It would be even more desirable if elimination of the abrupt torque rise could be achieved using significantly lower levels of processing stabilizer than heretofore reported in the prior art. It would be still more advantageous if the above-noted improvements in processability, i.e., ability to eliminate significant and abrupt changes in melt viscosity of the HDPE during extended processing, could be achieved using a known phosphite compound with conventional hindered phenols.

SUMMARY OF THE INVENTION

The aforementioned benefits and other advantages are achieved with the HDPE compositions of the present invention which are stabilized using a combination of a hindered phenol primary antioxidant and a secondary antioxidant which has three cyclic phosphite moieties linked via a nitrogen atom, namely, 2, [[ 2,4,8,10-tetrakis (1,1-dimethylethyl)dibenzo [d, f][1,3,2]dioxaphosphepin-6-yl ]oxy]-N, N-bis[2-[[2,4,8,10-tetrakis (1,1-dimethylethyl)dibenzo[d,f][1,3,2]dioxaphosphenpin-6-yl]oxy]-ethyl]ethanamine. By using the above-identified stabilizer combinations with Phillips' process HDPE resins, significantly improved stability of melt viscosity is obtained when the resins are processed under conditions which closely mimic conditions of heat and shear encountered during most commercial processing operations.

The high density polyethylene compositions of the invention which exhibit improved processing stability more specifically comprise (a) an ethylene homopolymer or copolymer of ethylene and $C_{3-8}$ α-olefin having a density of 0.94 or greater, melt index from 0.01 to 10 and unsaturation content greater than 0.5 vinyl units per 1000 carbon atoms; (b) an effective amount of hindered phenol; and (c) an effective amount of 2, [[2,4,8,10-tetrakis (1,1-dimethylethyl) dibenzo [ d, f][1,3,2] -dioxaphosphepin-6-yl] oxy]-N,N-bis [2-[[2,4,8,10-tetrakis (1,1-dimethylethyl)dibenzo [ d,f][1,3,2]dioxaphosphenpin- 6-yl]oxy]-ethyl]ethanamine. The compositions generally contain from about 25 to 1000 ppm (c) and 50 to 2000 ppm (b) based on the weight of said ethylene homopolymer or copolymer.

DETAILED DESCRIPTION OF THE INVENTION

Figure 1:
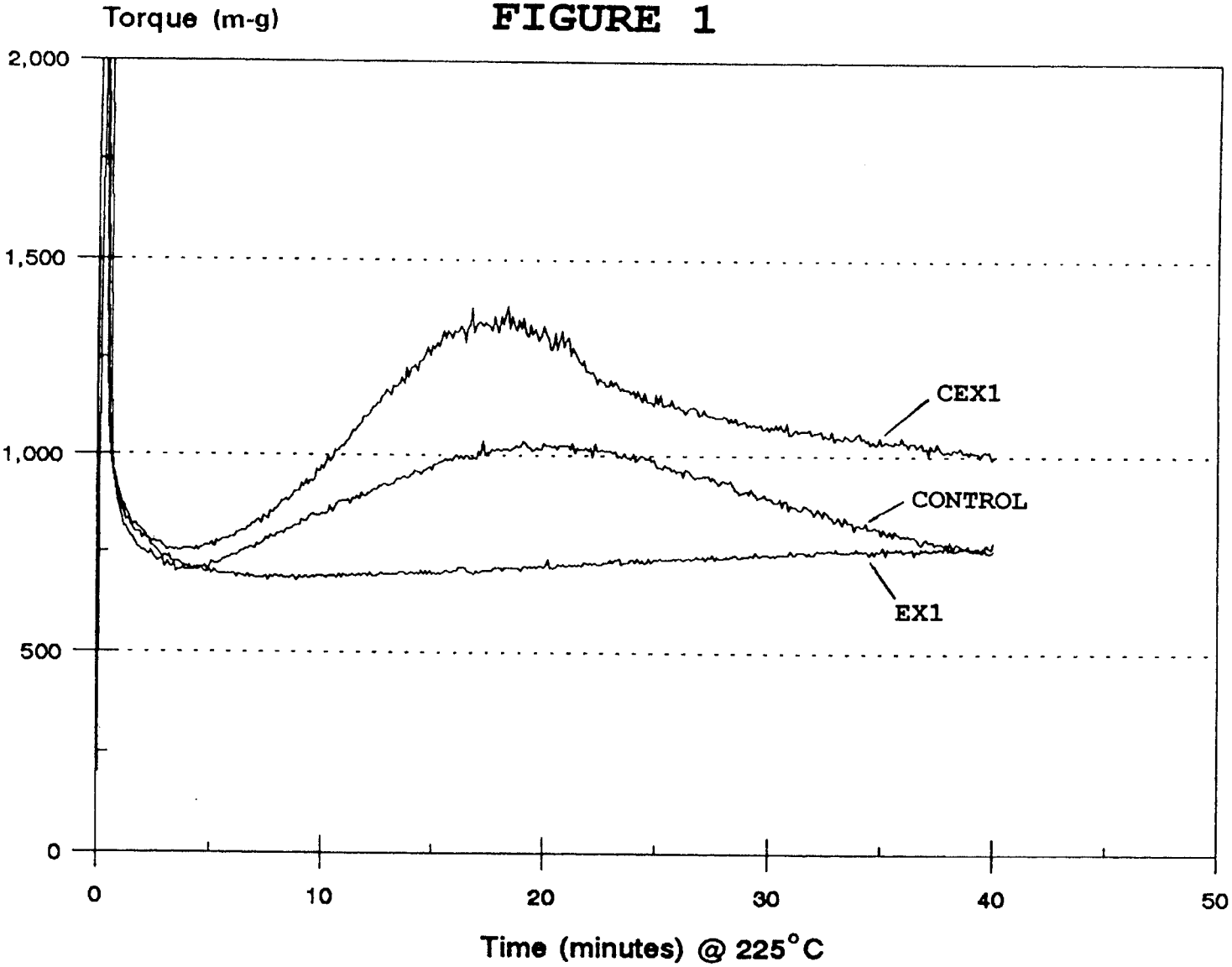
FIG. 1 is a plot of torque (meter-grams) versus time (minutes) obtained from the torque rheometer for the formulations of Example 1. EX1 is the product of the invention and CEX1 is the comparative formulation. The torque curve for the unstabilized resin (Control) is also provided.

High density polyethylene resins susceptible to chain extension, i.e., crosslinking, during melt processing due to the presence of significant amounts of vinyl unsaturation are utilized for the inventive compositions. Such HDPE resins are obtained by the so-called Phillips' processes which utilize chromium or modified chromium catalysts on a silica or silica-alumina support for the low pressure polymerization of ethylene in solution or slurry reactors. Slurry processes are also referred to as particle form polymerizations. The chromium catalysts are typically prepared by impregnating the support with a solution of a chromium compound and then activating by calcining in air.

Phillips' HDPE polymerization processes are well known and described in the prior art, e.g., U.S. Pat. No. 3,644,323. In general the polymerizations are carried out in a liquid organic medium at temperatures from about 150° to 350° F. and 100 to 800 psig. The chromium catalyst is suspended in the organic medium and the reaction is conducted at a pressure sufficient to maintain the organic diluent and at least a portion of the olefin in the liquid phase. The weight percentage of ethylene in the reactor is generally maintained from about 1.5 up to about 7. A small amount of one or more other $C_{3-8}$ α-olefins may be included.

Hydrogen is generally added during in the polymerization reaction to control molecular weight and other modifiers may be included as well. The molar weight ratio of hydrogen to ethylene in the reactor is generally maintained between 0.25 and 1.0. While not necessary for polymerization, a reducing agent can be included with the chrome catalyst. The organic medium is generally a paraffinic and/or cycloparaffinic material such as propane, butane, isobutane, pentane, isopentane, cyclohexane, methylcyclohexane, and the like. In the slurry process, the medium is chosen so that under the conditions employed the polymer is insoluble in the medium and readily recoverable in the form of solid particles. Isobutane is particularly advantageous for these polymerizations. Catalyst concentrations can range from about 0.001 to about 1 percent, based on the total weight of the reactor contents. The polymerizations can be conducted as batch, continuous or semi-continuous operations.

Catalysts employed are conventional chromium catalysts obtained by depositing a chromium compound onto an inorganic support material having surface hydroxyl groups. Known chromium-containing compounds capable of reacting with the surface hydroxyl groups of the support material are employed. The chromium-containing support is generally activated by heating at a temperature above about 450° F. but below the decomposition temperature of the support. The supported chromium catalyst may be modified by including one or more metal and/or non-metal compounds. These so-called "modified" chromium catalysts are highly useful for the production of HDPE.

Useful inorganic supports include inorganic oxides such as silica, alumina, silica-alumina mixtures, thoria, zirconia and comparable oxides which are porous, have a medium surface area, and have surface hydroxyl groups. Silica xerogels such as those described in U.S. Pat. No. 3,652,214 which have surface areas in the range of 200 to 500 $m^2/g$ and pore volumes greater than about 2.0 cc/g are also highly useful.

Any chromium-containing compound capable of reacting with the surface hydroxyl groups of an inorganic support can be used for the catalyst. Examples of such compounds include chromium trioxide, chromium nitrate, chromate esters such as the hindered di-tertiary polyalicyclic chromate esters, chromium acetate, chromium acetylacetonate, t-butyl chromate, silyl chromate esters and phosphorus-containing chromate esters such as are disclosed in U.S. Pat. Nos. 3,642,749 and 3,704,287, organophosphoryl chromium compounds such as are disclosed in U.S. Pat. No. 3,985,676, and organochromium compounds, such as chromocene.

Aluminum compounds are commonly included as modifiers with the chromium compound in the preparation of useful catalysts. Any aluminum compound capable of reacting with the surface hydroxyl groups of the inorganic support material can be used. Highly useful aluminum compounds correspond to the formula:

$$Al(R)_a(OR)_b(Z)_c$$

wherein R is an alkyl or aryl group having from one to eight carbon atoms, Z is H or a halogen, a is 0–3, b is 0–3, c is 0–3, and a+b+c equals 3. Examples of such aluminum compounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum, etc.; alkyl or aryl aluminum halides such as diethyl aluminum chloride; aryl aluminum compounds such as triphenyl aluminum, aryloxy aluminum compounds such as triphenyl aluminum, aryloxy aluminum compounds such as aluminum phenoxide and mixed aryl, alkyl and aryloxy, alkyl aluminum compounds.

Still other metal components can be used to modify the chromium catalyst. For example, compounds which can be utilized to incorporate titanium and zirconium include titanates and zirconates of the formula $(R_1)_nMe(OR_1)_m$ where Me is titanium or zirconium; $R_1$ is a hydrocarbon radical selected from alkyl, cycloalkyl, aryl, aralkyl or alkaryl having from 1–12 carbon atoms; m is an integer from 1 to 4, n is an integer from 0 to 3 and m plus n is equal to 4; and titanium or zirconium halides of the formula $MeX_4$ where Me is titanium or zirconium and X is chlorine, bromine, fluorine or iodine. Titanium and zirconium compounds represented by the formula $Me(OR_2)_4$ where Me is the same as defined about and $R_2$ is a $C_{1-7}$ alkyl group, for example, tetraethyl titanate, tetraisopropyl titanate, tetraisopropyl zirconate, tetrabutyl titanate, etc., are conveniently deposited on the support by deposition from hydrocarbon solutions. Titanium and zirconium acetylacetonate compounds, such as titanyl acetylacetonate and titanium diacetylacetonate diisopropylate, can also be used to deposit these metals.

Boron is a useful modifier and conveniently incorporated by utilizing an alkyl ester of boron wherein the alkyl group contains from 1 to 7 carbon atoms, such as trimethyl borate and triisopropyl borate, or a halide or boron.

The above compounds can be deposited on the inorganic support in any suitable manner such as by vapor coating or by impregnating the support with solutions of the metal containing compound. Suitable inert solvents, which are normally anhydrous for solution depositions, include aliphatic, cycloalkyl and alkylaryl hydrocarbons and their halogenated derivatives. A preferred organic solvent is dichloromethane. Where the catalyst contains additional metals, the chromium containing compound may be applied to the support first followed by deposition of the other metal compound(s) or the chromium and metal compound(s) may be applied together.

The catalysts can contain from about 0.25 to 4 weight percent chromium; however, more typically Cr contents will range from 0.5 to 2.5 weight percent. Aluminum contents can range from 0.1 to 10% by weight but, more preferably, will be from about 0.5 to 5 weight percent. Other metal or non-metal modifiers will typically be used in amounts such that the metal/non-metal content is from 0.1 to 6 weight percent.

After the chromium compound and optional metal/non-metal compounds have been deposited on the inorganic support, the support is heated in a non-reducing atmosphere, preferably in an oxygen containing atmosphere, at a temperature above about 450° F. The temperature should not, however, exceed the decomposition temperature of the support. Typically, this heat activation procedure is carried out at temperatures from 450° F. to 1700° F. in dried (less than 2–3 ppm water) air. The heating time may vary depending on the temperatures used but generally is for periods of 2 to 12 hours.

Prior to the above-described thermal activation, it is also possible to reductively treat the catalyst component(s) in accordance with procedures such as those described in U.S. Pat. No. 4,041,224. Such treatment entails heating at a temperature from about 575° F. to 1650° F. in a reducing atmosphere for a period of time which can range from several minutes up to several hours. Preferably, the reducing atmosphere consists of a mixture of inert gas with a reducing gas, such as mixtures of nitrogen and carbon monoxide. Heating in the reducing atmosphere is preferably conducted at temperatures from about 1000° F. to 1400° F. When the catalyst component is first heated in a reducing atmosphere, the subsequent heat activation in a non-reducing atmosphere is usually carried out from 800° F. to 1100° F.

Two or more catalyst components prepared in accordance with the above-described procedures may be combined and used for the polymerization of ethylene. In other words, discrete supported catalyst components independently prepared can be combined in defined ratios to provide so-called "mixed catalysts." The discrete catalyst components used may all contain chromium but this is not necessary as long as one of the components is chromium based. Similarly, the catalyst components may contain different levels of chromium and may contain one or more different metallic or non-metallic catalytic agents which can be the same or different and present in varying amounts. Furthermore, the supports used for preparation of the catalyst components may be different and the catalyst components may be activated under different conditions. The possible variations to provide useful mixed catalysts for ethylene polymerizations are numerous. Mixed catalysts useful for the preparation of broad MWD HDPE resins are described in U.S. Pat. Nos. 4,981,927; 5,081,089 and 5,198,400.

The heat-activated supported chromium and modified chromium catalysts can be used by themselves or, as is more commonly the case, combined with a metallic and/or non-metallic reducing agents for the polymerization. Useful metallic reducing agents include trialkyl aluminums, such as triethyl aluminum and triisobutyl aluminum, alkyl aluminum halides, alkyl aluminum alkoxides, dialkyl zinc, dialkyl magnesium, and alkali metal borohydrides, especially borohydrides of sodium, lithium and potassium. Non-metallic reducing agents include alkyl boranes such as triethyl borane, triisobutyl borane, and trimethyl borane and hydrides of boron such as diborane, pentaborane, hexaborane and decaborane. The amount of metallic or non-metallic reducing agent will vary.

The high density resins produced by the above processes and utilized for the compositions of the invention are homopolymers of ethylene or copolymers of ethylene with a C3–8-e and, more preferably, $C_{4-8}$-e alpha-olefin. Butene-1 and hexene-1 are especially useful comonomers for the production of high density ethylene copolymers. The homopolymers and copolymers have densities of 0.94 or greater and, more preferably, from 0.945 up to 0.965. Melt indexes of the homopolymers or copolymers will vary depending on the intended application but will generally range from about 0.01 to 10. The lower melt index resins are typically employed for blow molding and film production whereas higher melt index resins are useful for film, rotational molding, and injection molding. In a highly useful embodiment of the invention, the melt index of the HDPE resin is the range from 0.05 to 5. Melt indexes referred to herein are determined in accordance with ASTM D1238–57T at 190° C. and 2160 grams load.

Phillips' process HDPE homopolymer and copolymer resins are further characterized as having unsaturation contents of about 0.5 units of vinyl unsaturation per 1000 carbon atoms and above. More commonly, unsaturation contents of these resins ranges from 0.5 to 2 vinyl units per 1000 carbon atoms. Vinyl unsaturation is determined by infrared spectroscopy using the 910 $cm^{-1}$ band in accordance with the procedures of E. Cernia, C. Mancini and G. Montaudo, *J. Polymer Sci.*, B1, 371–377 (1963) and R. deKock and P. Hol, *J. Polymer Sci.*, B2, 339–341 (1964). As a result of the substantially higher vinyl unsaturation contents of Phillips' process HDPEs compared to HDPEs produced using Ziegler-Natta catalysts, the former have a marked propensity to chain extend or crosslink during melt processing. These molecular changes produce a pronounced increase in melt viscosity which is undesirable from the standpoint of the processor. Furthermore, significant crosslinking produces high molecular weight insoluble polymer gels and, in extreme situations, leads to the formation of black specks.

To improve the processing stability of Phillips' process HDPE and avoid or minimize processing problems, an effective amount of a stabilizer package comprised of a hindered phenol primary antioxidant and a secondary antioxidant having three cyclic phosphite moieties linked via a nitrogen atom is added to the HDPE resin. The hindered phenol can be any of the conventional sterically hindered phenols known to the art which function as primary antioxidants and have two alkyl groups adjacent to a hydroxy substituent on an aromatic ring.

More specifically, hindered phenols which can be used as primary antioxidants for the compositions of the invention contain one or more substituted aromatic moieties of the formula

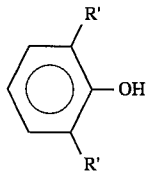

where R' is a $C_{1-4}$ alkyl group and, most preferably, a tertiary butyl group. The R' groups can be the same or different. The remaining positions on the ring of the dialkylhydroxyaryl moiety can be substituted with one or more radicals.

Hindered phenols containing a single aromatic moiety of the above type include 2,6-di-t-butyl-p-cresol, α-tocopherol (also known as Vitamin E) and octadecyl 3,5-di-t-butyl-4-hydroxyhydrocinnamate. When more than one dialkylhydroxyaryl moiety are present in the molecule, the group will be joined through a linking group and the resulting phenolic compounds will correspond to the formula

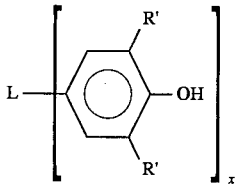

where x is an integer from 2 to 4, L represents the linking group, and R' is the same as defined above.

Representative linking groups include:

$$-CH_2- \quad \text{(a)}$$

$$C\left(CH_2OC(=O)CH_2CH_2\right)_4 \quad \text{(b)}$$

-continued

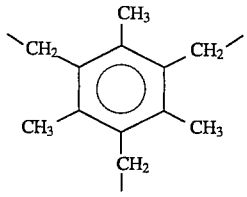

(c)

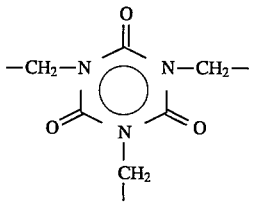

(d)

$$-CH_2CH_2-CNHNHC-CH_2CH_2- \text{ and} \quad \text{(e)}$$

$$-CH_2CH_2COCH_2CH_2-S-CH_2CH_2OCCH_2CH_2-. \quad \text{(f)}$$

It is advantageous with compounds of the above type if at least one of the R' groups is t-butyl. It is especially useful when both R' groups are t-butyl. Representative hindered phenols having more than one dialkylhydroxyaryl group connected through a linking group include:

4,4'-Methylenebis (2,6-di-t-butylphenol); Tetrakis [methylene(3,5-di-t-butyl-4-hydroxyhydrocinnamate)]methane;

1,3,5-Trimethyl-2,4,6-tris(3,5-di-t-butyl-4-hydroxybenzyl)-benzene;

1,3,5-Tris(3,5-di-t-butyl-4-hydroxybenzyl)-s-triazine2,4,6(1H, 3H, 5H) trione;

N,N'-Bis[3-(3,5-di-t-butyl-4-hydroxyphenyl)propanyl] hydrazine; and

Thiodiethylene bis(3,5-di-t-butyl-4-hydroxy)hydrocinnamate.

In a preferred embodiment of the invention, the hindered phenol will be selected from the group consisting of:

α-Tocopherol;

Octadecyl 3,5-di-t-butyl-4-hydroxhydrocinnamate;

Tetrakis[methylene(3,5-di-t-butyl-4-hydroxyhydrocinnamate)]methane;

Thiodiethylene bis-(3,5-di-t-butyl-4-hydroxy)hydrocinnamate; and mixtures thereof. The mixtures may contain two or more compounds from the group or can include other hindered phenols. All of the hindered phenols in the preferred group are commercially available. α-Tocopherol (2,5,7,8-tetramethyl-2(4',8',12'-trimethyltridecyl) chroman-6-ol) is available from Roche Vitamins and Fine Chemicals, a division of Hoffman-LaRoche, Inc., and is sold under the trademark RONOTEC 201 and 202. The two products constitute different grades (assays) of α-tocopherol. Octadecyl 3,5-di-t-butyl-4-hydroxyhydrocinnamate is available from Ciba-Geigy Corporation under the trademark IRGANOX 1076. Tetrakis [methylene (3,5-di-t-butyl-4-hydroxyhydrocinnamate)]methane is available from Ciba-Geigy Corporation under the trademark IRGANOX 1010. Thiodiethylene bis-(3,5-di-t-butyl-4-hydroxy)hydrocinnamate is available from Ciba-Geigy Corporation under the trademark IRGANOX 1035.

Whereas the use of hindered phenols in conjunction with phosphites or phosphonites has been suggested for the stabilization of polyolefins, heretofore it has not been possible using conventional phosphites and phosphonites to eliminate the abrupt upturn in torque characteristically obtained within the first twenty minutes when Phillips' process HDPE resins are processed under high shear conditions, such as in a torque rheometer. This upturn in torque corresponds to the onset of significant crosslinking, i.e., chain extension, which produces the undesirable decrease in melt viscosity. The slope (rate of torque increase) and height of the torque curve provide a general indication of the severity of crosslinking. When conventional phosphites and phosphonites are employed with hindered phenols for the stabilization of Phillips' HDPEs, even at high levels, it has only been possible to delay the onset of rapid crosslinking under severe processing conditions such as are applied in a torque rheometer. In some instances, use of recommended phosphite and phosphonite processing stabilizers with hindered phenolic primary antioxidants even has a detrimental effect on melt stability, i.e., appears to promote crosslinking.

It has now quite unexpectedly been discovered that by using the specific phosphite of the invention in combination with conventional hindered phenolic primary antioxidants the sharp upturn in torque obtained with conventional phosphite and phosphonite stabilizers and attributable to excessive and rapid crosslinking can be eliminated. In most instances with the inventive stabilizer combinations, the torque required to process Phillips' process HDPE resins under conditions of shear remains essentially constant over the processing period or shows only a gradual increase, depending on the particular HDPE being used. Furthermore, it is possible to achieve these results, i.e., avoid significant and rapid changes in melt viscosity, at low total stabilizer levels.

This unexpected improvement is achieved using an effective amount of a phosphite having three cyclic moieties linked by a nitrogen atom and corresponding to the structural formula

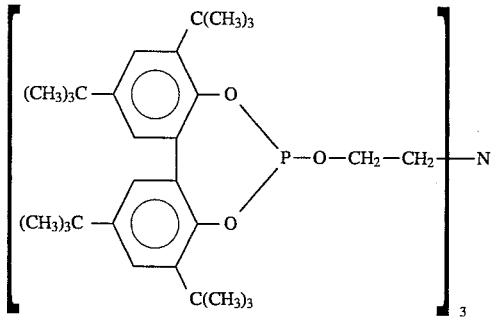

The compound, 2, [[2,4,8,10-tetrakis (1,1-dimethylethyl)dibenzo [d,f][1,3,2dioxaphosphepin-6-yl]oxy]-N,N-bis-[2-[[2,4,8,10-tetrakis 1,1-dimethylethyl)dibenzo[d,f][1,3,2 dioxaphosphenpin-6-yl]oxy]-ethyl]ethanamine and abbreviated herein as TDE, is disclosed in U.S. Pat. No. 4,318,845 which is incorporated herein by reference. TDE is available from Ciba-Geigy Corporation and sold under the trademark IRGAFOS 12.

When the TDE is utilized at levels from 25 to 1000 ppm by weight of the HDPE homopolymer or copolymer in conjunction with one or more of the above-described hindered phenols, the resulting resin compositions have essentially uniform melt viscosities over the entire processing period. Furthermore, articles produced from the resulting resin compositions have acceptable oxidative stability for the intended application. More commonly, the TDE is employed at levels from about 50 to 750 ppm and, most preferably, 100 to 500 ppm. The hindered phenol(s) will be present in amounts ranging from about 50 up to about 2000 ppm and, more preferably, from about 100 to 750 ppm. PPM as used herein are based on the weight of the HDPE homopolymer or copolymer. In a highly useful embodiment of the invention the weight ratio of primary antioxidant (hindered phenol(s)) to secondary antioxidant (TDE) ranges from about 10:1 to 1:3 and, more preferably, from 3: 1 to 1:2.

Phillips' process HDPE compositions stabilized in accordance with the invention having improved processing stability are useful for a variety of applications depending on the resin properties. For example, HDPE compositions having melt indexes in the specified ranges are commonly used to blow mold bottles, such as milk, oil and detergent bottles, and for the production of extruded film and sheet. Film applications include grocery and merchandise bags, food packaging and can liners. In addition to providing improved stability during processing, the stabilizer compositions of the invention also provide protection for the articles produced therefrom.

Depending on the particular application involved, it may be advantageous to include one or more additional additives in the HDPE composition. Useful additives can include UV stabilizers, mold release agents, antistatic agents, slip agents, antiblock agents, lubricants, processing aids, nucleating agents, colorants, pigments, fillers, reinforcing agents and the like. The amount of these optional ingredients will vary widely depending on the application involved and the additive(s); however, in most cases the total amount of these additional additives will be less than 10 parts per 100 parts resin (phr) and individual additives will not exceed 5 phr.

The TDE, hindered phenol and any optional additives are incorporated into the HDPE using conventional procedures known to the art, such as dry blending or melt blending, capable of uniformly distributing the additives throughout the HDPE. Dry blending can be accomplished using a Henschel mixer or cone blender. The additives can also be added to the HDPE melt and dispersed using a Banbury mixer, single or twin screw extruder or like mixing apparatus. The hindered phenol, TDE and any other additives may be added individually or combined, such as in a masterbatch, for incorporation into the HDPE.

EXAMPLES

The following detailed examples describe the various aspects of the invention in greater detail. The examples are provided for illustrative purposes to enable one skilled in the art to practice the invention and are not intended to limit the scope thereof. Numerous variations are possible without deviating from the spirit and scope of the invention.

In the examples all parts and percentages are given on a weight basis unless otherwise indicated. Melt index and terminal vinyl unsaturation content per 1000 carbon atoms were determined in accordance with the previously described procedures.

Processing stability of the HDPE compositions was determined using a Haake Buchler Rheomix™ 400 torque rheometer fitted with counter rotating sigma style rotors. This is an open type laboratory intensive mixer designed to simulate widely used production mixers. Rotor speed was set at 60 rpm and the temperature was set at 225° C. No provision was made for the exclusion of air. Forty (40) grams of the HDPE resin composition was used for each test. Samples were processed for 40 minutes during which time the torque, measured in meter-grams (m-g), was monitored and plotted against time. Variations in torque during processing correspond to changes in melt viscosity and are readily apparent from an examination of the torque curves. The rate of change, expressed in m-g per minute, between the minimum and maximum torque values was calculated using data obtained from the torque curves and the following equation:

$$\frac{\text{Torque}_{max} - \text{Torque}_{min}}{\text{Time of Torque}_{max} - \text{Time of Torque}_{min}} = \text{Rate of Torque Change}$$

Torque rate increase numbers obtained from the above equation and reported in the tables were rounded off to the nearest whole number. The improved processing stability obtained with the compositions of the invention can be similarly demonstrated using other types of torque rheometers and/or processing conditions.

Three HDPE resins, identified as A, B and C, were employed in the examples. All of the resins were obtained by the particle form, i.e., slurry, (co)polymerization of ethylene in a circulating loop-type reactor with turbulent flow using a silica supported chromium catalyst. Resin C was a homopolymer whereas Resins A and B were copolymers of ethylene with hexene-1 and butene-1, respectively. Resin type, i.e., primary end use application, density, melt index, and vinyl unsaturation content for each are set forth below along with the type of catalyst used for the polymerization.

| | A | B | C |
|---|---|---|---|
| Resin Type | Blow molding | Blow molding | Film |
| Catalyst | Al-modified chromium | B-modified chromium | Ti-modified chromium |
| Density | 0.953 | 0.952 | 0.963 |
| Melt Index | 0.30 | 0.30 | 1.2 |
| Vinyl Unsaturation Content | 0.9 | 0.9 | 1.2 |

The following is a listing of abbreviations of the various ingredients used in the examples.

| | |
|---|---|
| | PRIMARY ANTIOXIDANTS |
| PA01 | Octadecyl 3,5-di-t-butyl-4-hydroxyhydrocinnamate; available from Ciba-Geigy Corp. as IRGANOX 1076 |
| PA02 | Tetrakis[methylene(3,5-di-t-butyl-4-hydroxyhydrocinnamate)]methane; available from Ciba-Geigy Corp. as IRGANOX 1010 |
| PA03 | 2,5,7,8-Tetramethyl-2(4',8',12'-trimethyltridecyl)chroman-6-ol; 92%, available from Roche Vitamins and Fine Chemicals, a division of Hoffman-LaRoche, Inc. as RONOTEC 201 |
| PA04 | 2,5,7,8-Tetramethyl-2(4',8',12'-trimethyltridecyl)chroman-6-ol; 96%, available from Roche Vitamins and Fine Chemicals, a division of Hoffman-LaRoche, Inc. as RONOTEC 202 |
| | SECONDARY ANTIOXIDANTS |
| SA01 | Bis(2,4-di-t-butylphenyl)pentaerythritol diphosphite containing 1% triisopropanolamine; available from G.E. Speciality Chemicals as ULTRANOX 626 |
| SA02 | Tris-(2,4-di-tert-butylphenyl)phosphite; available from Ciba-Geigy Corp. as IRGAFOS 168 |
| SA03 | Tetrakis(2,4-di-tert-butylphenyl)-4,4'-biphenylylenediphosphonite; available from Sandoz Colors and Chemicals Corp. as SANDOSTAB P-EPQ |
| SA04 | Di(stearyl)pentaerythritol diphosphite containing up to 1% triisopropanolamine; available from G.E. Speciality Chemicals as WESTON 619 |

Example 1

To demonstrate the marked improvement in processing stability obtained with the HDPE compositions of the invention, Resin A was stabilized using a combination of hindered phenol and TDE. For comparison, Resin A was also formulated with identical levels of the same hindered phenol and a commercial phosphite stabilizer. The processing characteristics of these compositions, respectively referred to as EX1 and CEX1, were evaluated using the torque rheometer along with a control which contained no stabilizers of any type. The formulations employed were as follow:

| ADDITIVE | EX1 | CEX1 | CONTROL |
|---|---|---|---|
| PA01 | 250 ppm | 250 ppm | — |
| SA01 | — | 250 ppm | — |
| TDE | 250 ppm | — | — |

For these evaluations the resin powder and additives (when employed) were added to the preheated bowl of the rheometer and mixing commenced. As the resin comes up to temperature and begins to melt, the torque drops sharply until a minimum torque value is reached. With the control, the torque reached a minimum of about 700 m-g within about 4 minutes and then rose rapidly and peaked at 1050 m-g at about 19 minutes. With the comparative composition (CEX1) the abrupt increase in torque was even more pronounced. After reaching a minimum torque of about 750 m-g after 3–½ minutes, the torque then steadily climbed until it peaked at about 1350 m-g after about 18 minutes processing. These results suggest that the combination of hindered phenol PAO1 and conventional phosphite SAO1 exacerbate crosslinking of resin A during melt processing under conditions of shear. With the HDPE composition of the invention (EX1) the abrupt upturn in torque observed with the control and comparative formulation did not occur. With EX1 the torque reached a minimum value of about 700 m-g after about 6 minutes and then, as the resin continued to be processed, remainder of the 40 minute test period, only gradually increased to about 800 m-g at the end of the 40 minute test period. This represents an increase in torque of less than 15 percent. Considering only the change occurring between the minimum and maximum recorded torque values, the rate of torque increase for the product of the invention was less than 3 m-g/min compared to torque increases of about 51 m-g/min and about 23 m-g/min, respectively, for the comparative formulation CEX1 and the unstabilized control. The remarkable and unexpected improvement obtained using the TDE/hindered phenol stabilizer combination is further apparent from the torque curves produced during the course of these runs as set forth in FIG. 1.

Example 2

The ability to vary stabilizer concentration is demonstrated by the following example wherein Resin A was formulated with PAO1 and TDE in accordance with the invention. The composition was identified as EX2. Three comparative formulations were also prepared, identified as CEX2(a–c), using the same hindered phenol with different commercial phosphite stabilizers. Another comparative formulation, CEX2(d), was prepared containing only the hindered phenol stabilizer. The formulations (with stabilizer concentrations in ppm) were as follows:

| ADDITIVES | EX2 | CEX2 (a) | CEX2 (b) | CEX2 (c) | CEX2 (d) |
|---|---|---|---|---|---|
| PA01 | 600 | 600 | 600 | 600 | 600 |
| TDE | 300 | — | — | — | — |
| SA01 | — | 300 | — | — | — |
| SA02 | — | — | 300 | — | — |
| SA04 | — | — | — | 300 | — |

The stabilizers were added to the resin powder and the mixture melt blended and pelletized using a Killion single screw extruder maintained at about at 220° C. and equipped with a pelletizing head. Pellets obtained from the third pass extrusion were used to evaluate process stability. Data obtained during the melt processing, including minimum torque and time, maximum torque and time and the rate of torque change (m-g/min) between the minimum and maximum values, are reported in the table which follows.

| | Torque Min/Time | Torque Max/Time | Torque Rate Increase |
|---|---|---|---|
| EX2 | 850/7 | 1150/40 | 9 |
| CEX2 (a) | 1050/3 | 2400/32 | 47 |
| CEX2 (b) | 1050/3 | 2050/31 | 36 |
| CEX2 (c) | 1050/3 | 2400/32 | 47 |
| CEX2 (d) | 1050/3 | 1800/14 | 68 |

The above data demonstrate the marked improvement obtained with the HDPE compositions formulated in accordance with the invention compared to compositions identical in all respects except for the phosphite. A 35% increase in torque (between the minimum and maximum values) was obtained with EX2 whereas all of the comparative formulations had torque increases of 70% or greater.

Figure 2:
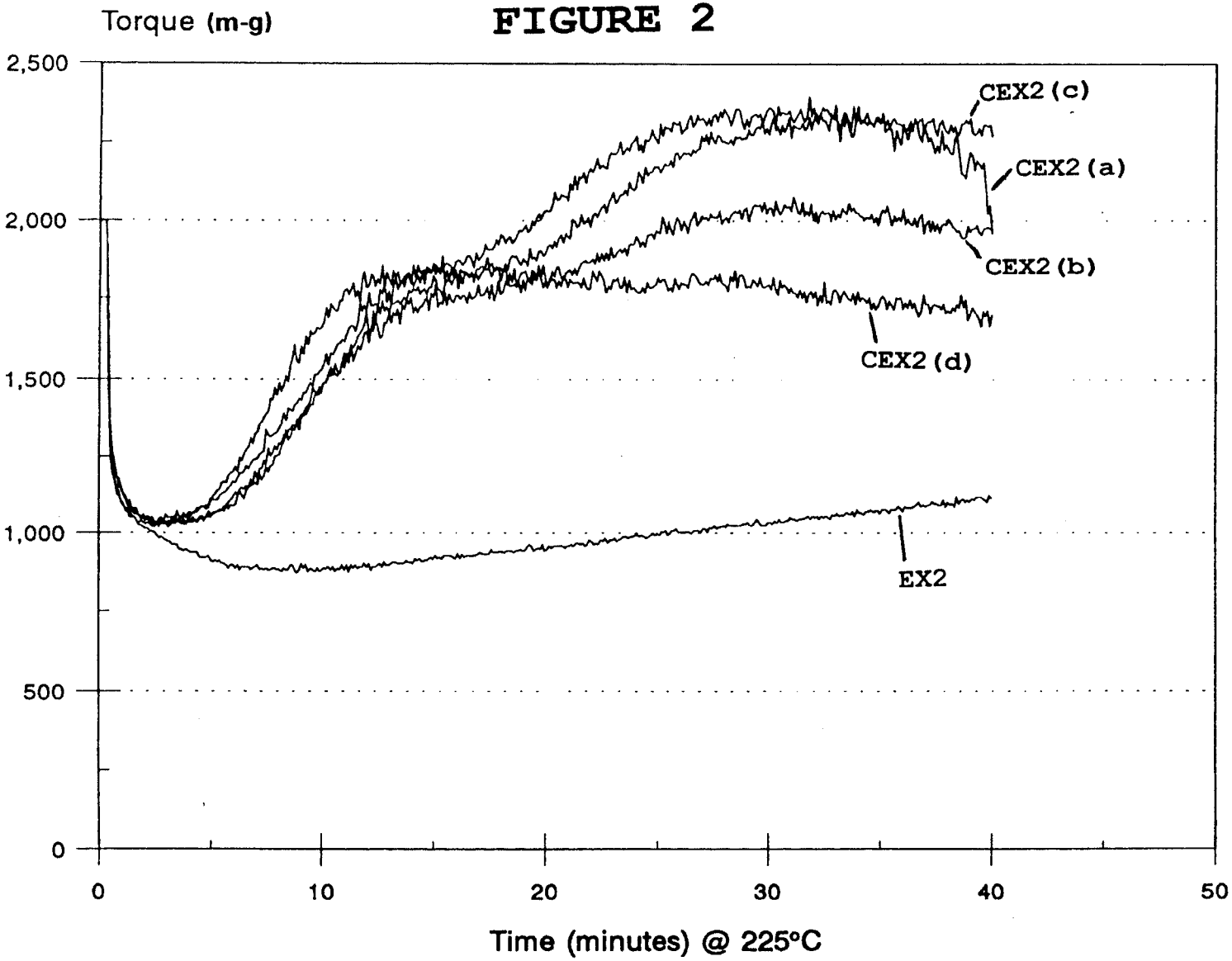
FIG. 2 is a plot of torque (meter-grams) versus time (minutes) obtained from the torque rheometer for the product of Example 2 (EX2) and the various formulations CEX2(a–d) provided for comparative purposes.

The torque curves generated during the 40 minute processing period for each of the formulations and from which the above data were obtained are provided in FIG. 2.

Example 3

Utilizing Resin B, a HDPE composition was formulated in accordance with the invention using a combination of PA02 and TDE. Details of the composition, identified as EX3, are provided in the table which follows. Also identified in the table are a comparative formulation (CEX3) prepared using PAO2 and a commercial phosphite stabilizer and a control resin which contained no stabilizers.

| ADDITIVE | EX1 | CEX1 | CONTROL |
|---|---|---|---|
| PA02 | 250 ppm | 250 ppm | — |
| SA02 | — | 250 ppm | — |
| TDE | 250 ppm | — | — |

Figure 3:
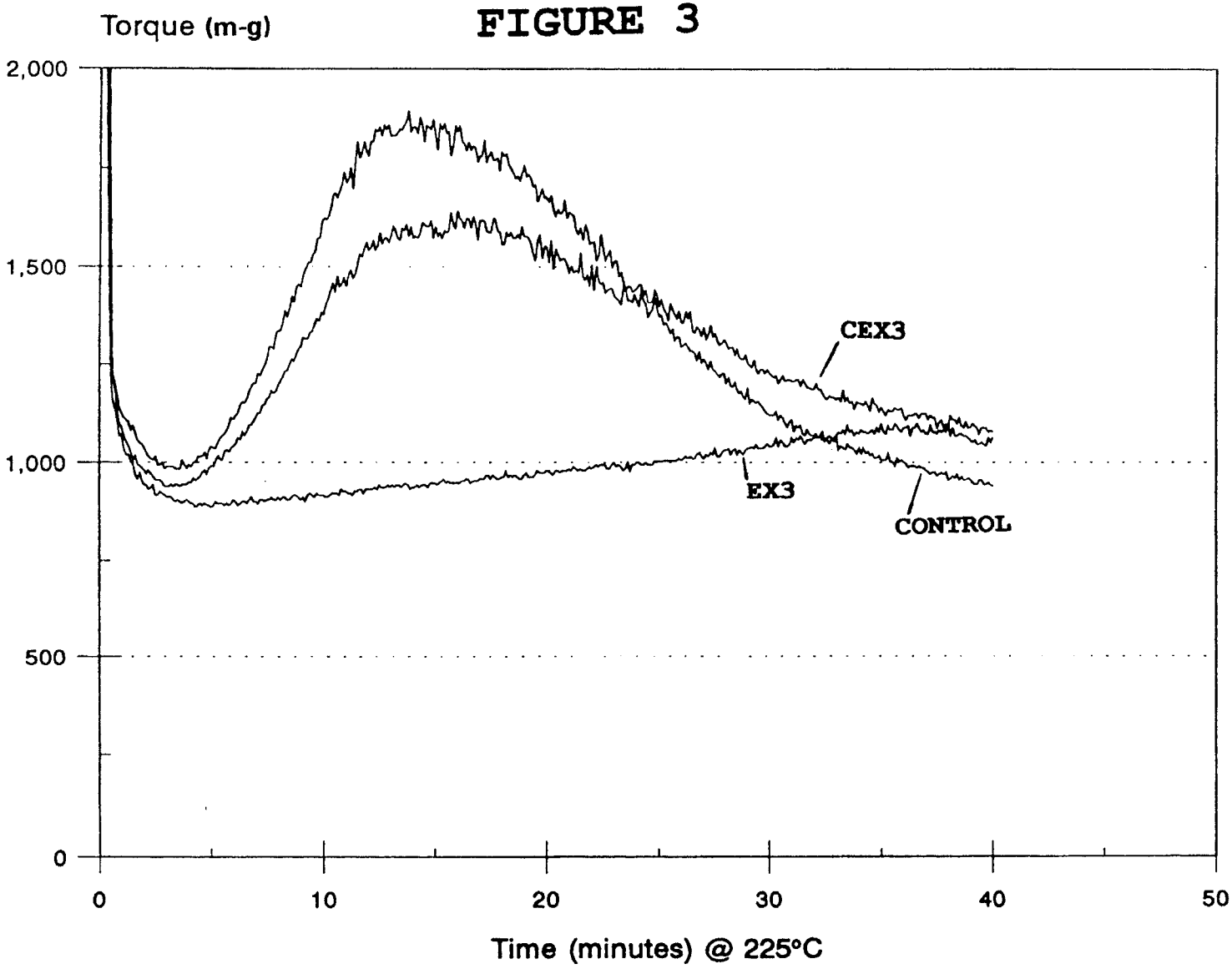
FIG. 3 is a plot of torque (meter-grams) versus time (minutes) obtained from the torque rheometer for the formulations of Example 3.

The compositions were evaluated following the procedure described in Example 1 and the torque curves obtained are provided in FIG. 3. The superior processing stability of the compositions of the invention is readily apparent from an examination of the torque curves. Whereas the control resin and comparative resin CEX3 had a pronounced and abrupt upturn in torque after about 5 minutes processing, the composition of the invention (EX3) had only a small increase in melt viscosity. Furthermore, the change in melt viscosity, i.e., torque increase, obtained with EX3 was gradual and the torque maximum did not occur until the 40 minute processing period was nearly complete. Minimum torque and time, maximum torque and time and the rate of torque change between the minimum and maximum values are tabulated below and further establish the marked improvement obtained with the inventive compositions.

| | Torque Min/Time | Torque Max/Time | Torque Rate Increase |
|---|---|---|---|
| EX3 | 850/5 | 1100/37 | 8 |
| CEX3 | 950/3 | 1600/14 | 59 |
| CONTROL | 1000/3 | 1850/16 | 65 |

Less than 30% increase in torque was obtained with EX3 from torque minimum to the torque maximum.

Example 4

Figure 4:
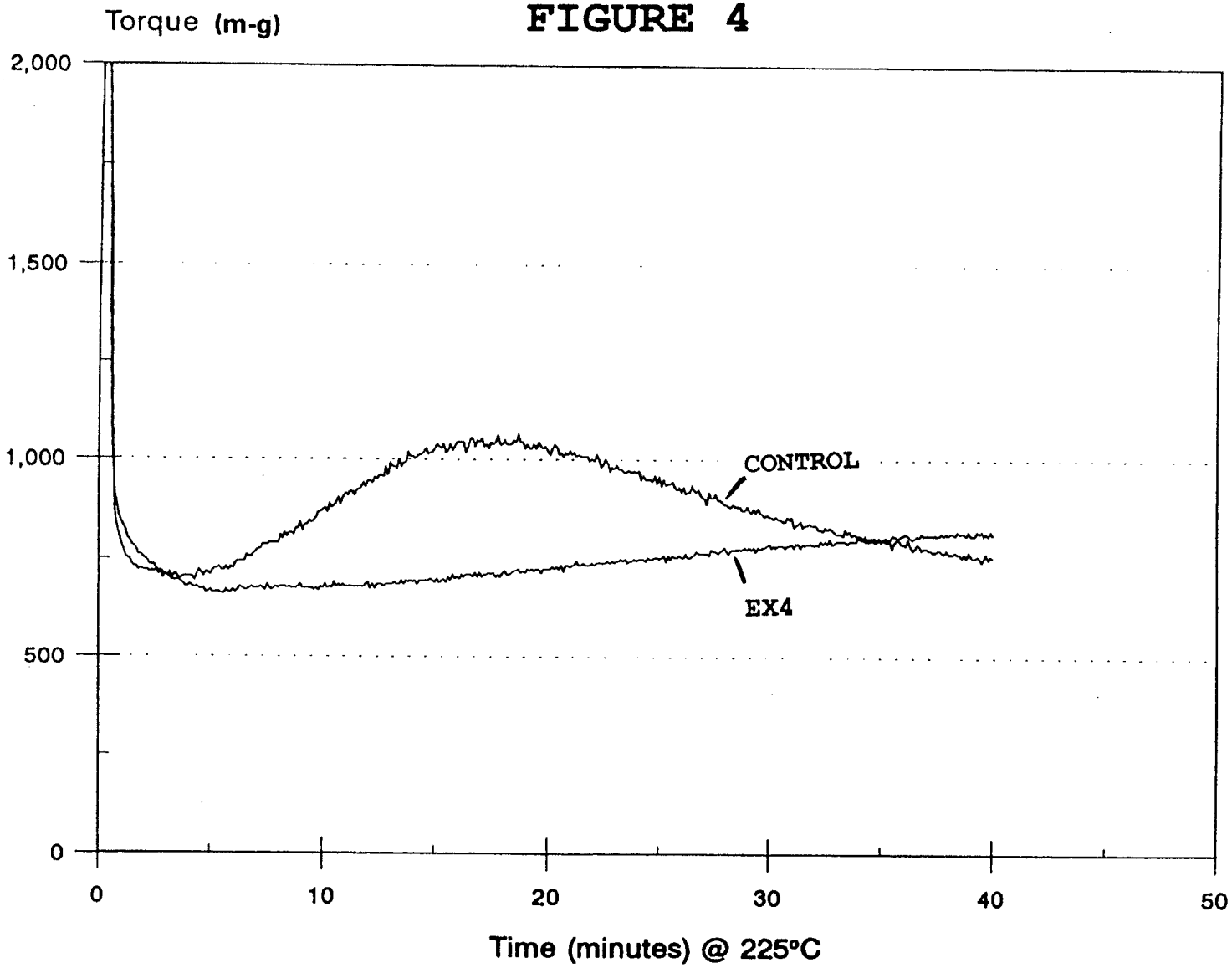
FIG. 4 is a plot of torque (meter-grams) versus time (minutes) obtained from the torque rheometer obtained for the product of Example 4 and unstabilized control.

Resin C was formulated using 250 ppm α-tocopherol (PA03) and 250 ppm TDE and evaluated for process stability following the procedure of Example 1. When Resin C was stabilized in accordance with the invention, the upturn in torque observed with the unstabilized resin about 5 minutes into the processing period was eliminated. With the composition of the invention, there was a very gradual, essentially linear, increase in torque (about 4 m-g/min) was obtained upon processing. Torque curves obtained for the composition of the invention, identified as EX4, the unstabilized barefoot resin, identified as CONTROL, are provided in FIG. 4. The increase in torque obtained for EX4 from the minimum (650 m-g) to the maximum (800 m-g) was less than 20%.

Example 5

The improvement obtained with the compositions of the invention are further apparent from the following example wherein a mixture of hindered phenolic primary antioxidants was used with the TDE. Comparative compositions formulated using conventional secondary antioxidants with the mixed hindered phenols and an unstabilized control composition were also evaluated. Resin C was used for all of the formulations. The amount (in ppm) and type of stabilizer used for each of the formulations were as follows:

| ADDITIVES | EX5 | CEX5 (a) | CEX5 (b) | CEX5 (c) | CONTROL |
|---|---|---|---|---|---|
| PA01 | 1000 | 1000 | 1000 | 1000 | — |
| PA04 | 100 | 100 | 100 | 100 | — |
| TDE | 500 | — | — | — | — |
| SA01 | — | 500 | — | — | — |
| SA02 | — | — | 500 | — | — |
| SA03 | — | — | — | 500 | — |

Figure 5:
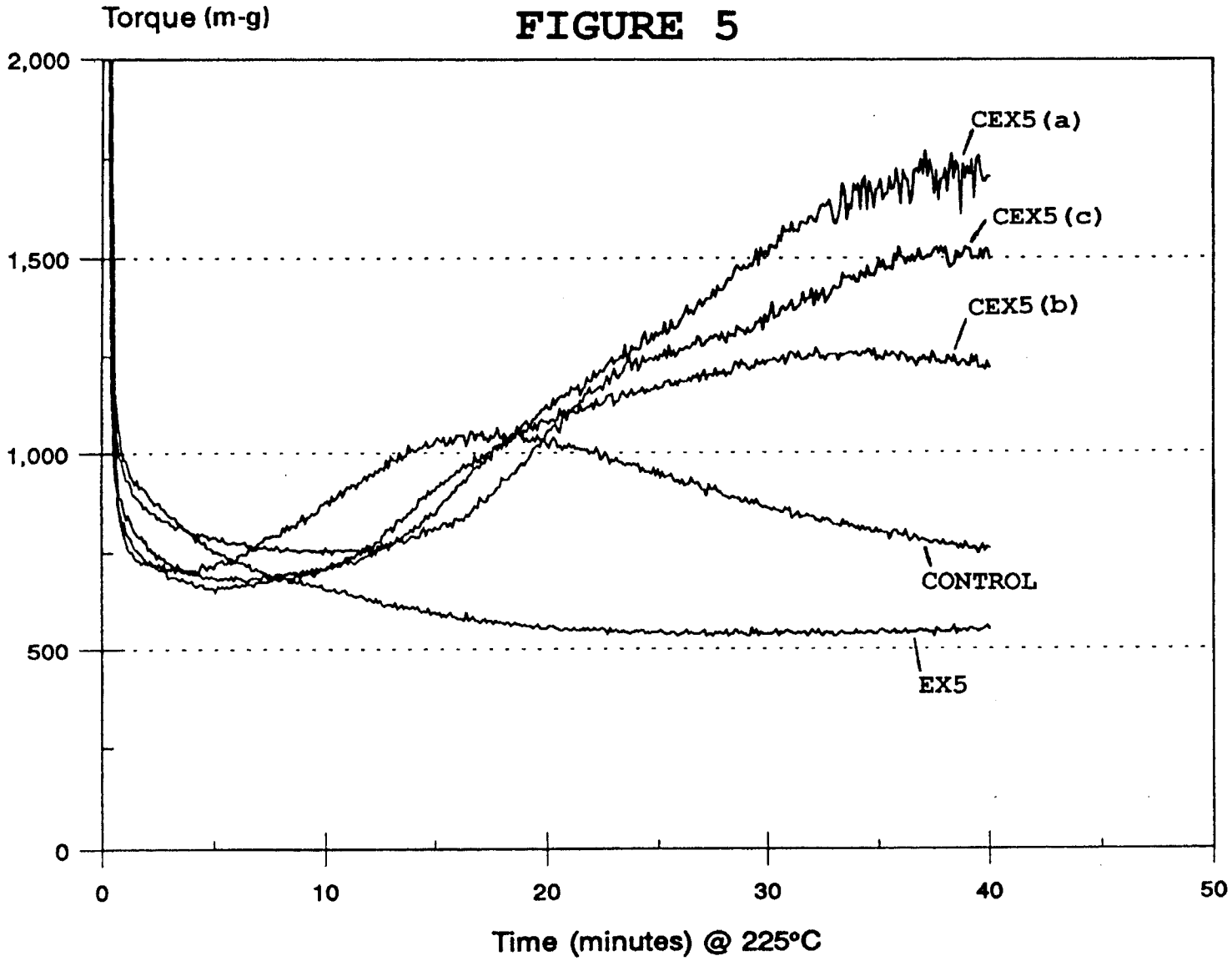
FIG. 5 is a plot of torque (meter-grams) versus time (minutes) obtained from the torque rheometer for the formulations of Example 5.

Process stability evaluations were made using third pass extruded pellets as described in Example 2. Whereas each of the three comparative formulations (CEX5 (a)-(c)) had very pronounced and rapid increases in torque, beginning after about 10 minutes and continuing over essentially the entire processing period, the composition stabilized in accordance with the invention (EX5) reached a minimum torque of about 525 m-g and remained essentially at that level for the duration of the test. Minimum and maximum torque values and the rate of torque change obtained for each of the compositions are provided in the following table and the corresponding torque curves are set forth in FIG. 5.

| | Torque Min/Time | Torque Max/Time | Torque Rate Increase |
|---|---|---|---|
| EX5 | 525/22 | 550/40 | 1 |
| CEX5 (a) | 675/5 | 1750/37 | 33 |
| CEX5 (b) | 675/5 | 1250/32 | 21 |
| CEX5 (c) | 675/5 | 1500/38 | 25 |
| CONTROL | 675/5 | 1100/18 | 33 |

The improved processing stability of the compositions of the invention are evident from the above data. With EX5, the torque increased less than 5% (between the observed minimum and maximum values).

It is apparent from the preceding examples and comparative examples that significantly improved processing stability is achieved with the HDPE compositions of the invention stabilized using a combination of one or more hindered phenols and TDE. Whereas the HDPE compositions stabilized using conventional phosphites and phosphonites all had a rapid torque rise when processed under conditions of high shear, the torque of the compositions of the invention only showed a gradual increase during identical processing. There were no abrupt and rapid increases in torque with the compositions of the invention. Rates of torque change less than about 15 meter-grams per minute and, more usually, less than 10 meter-grams per minute are consistently achieved when Phillips' process HDPEs are stabilized with a combination of one or more hindered phenols and TDE. Furthermore, these improved results can be achieved at low total stabilizer levels.

We claim:

1. A high density polyethylene resin composition having improved processing stability comprising:

(a) an ethylene homopolymer or copolymer of ethylene and $C_{3-8}$-olefin having a density of 0.94 or greater, melt index from 0.01 to 10 and unsaturation content greater than 0.5 vinyl units per 1000 carbon atoms;

(b) from about 50 to 2000 ppm by weight hindered phenol; and (c) from about 25 to 1000 ppm by weight 2,[[2,4,8,10-tetrakis(1,1-dimethylethyl)dibenzo[d,f][1,3,2]-dioxaphosphepin- 6-yl]oxy]-N,N-bis[2-[[2,4,8,10-tetrakis(1,1-dimethylethyl)dibenzo[d,f][1,3,2dioxaphosphenpin-6-yl]oxy]-ethyl]ethanamine.

2. The HDPE composition of claim 1 wherein (b) contains one or more substituted aromatic moieties of the formula

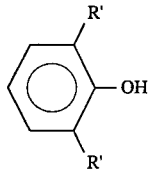

wherein R' is a $C_{1-4}$ alkyl group.

3. The HDPE composition of claim 1 wherein the weight ratio of (b) to (c) is from 10:1 to 1:3.

4. The HDPE composition of claim 3 wherein (a) has a density from 0.945 to 0.965.

5. The HDPE composition of claim 4 wherein (b) is selected from the group consisting of 2,6-di-t-butyl-p-cresol, α-tocopherol, octadecyl 3,5-di-t-butyl-4-hydroxyhydrocinnamate and a compound of formula

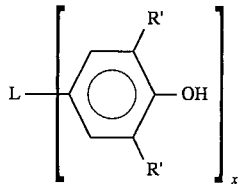

wherein x is an integer from 2 to 4, R' is a $C_{1-4}$ alkyl group and L is a linking group selected from the group consisting of $-CH_2-$ (a)

$C(CH_2OCCH_2CH_2)_4$ (b)

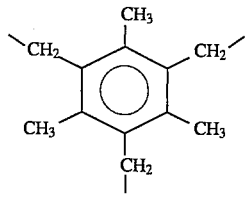

(c)

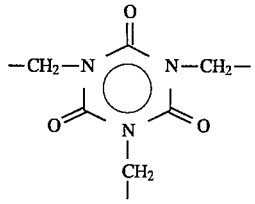

(d)

$-CH_2CH_2-CNHNHC-CH_2CH_2-$ and (e)

$-CH_2CH_2COCH_2CH_2-S-CH_2CH_2OCCH_2CH_2-$. (f)

6. The HDPE composition of claim 5 wherein the ethylene homopolymer or copolymer has an unsaturation content from 0.5 to 2 vinyl units per 1000 carbon atoms.

7. The HDPE composition of claim 6 wherein (a) has a melt index from 0.05 to 5.

8. The HDPE composition of claim 6 wherein (a) is a copolymer of ethylene and butene-1.

9. The HDPE composition of claim 6 wherein (a) is a copolymer of ethylene and hexene-1.

10. The HDPE composition of claim 6 wherein (b) is selected from the group consisting of α-tocopherol, octadecyl 3,5-di-t-butyl-4-hydroxhydrocinnamate, tetrakis[methylene(3,5-di-t-butyl-4-hydroxyhydrocinnamate)]methane, thiodiethylene bis-(3,5-di-t-butyl- 4-hydroxy)hydrocinnamate, and mixtures thereof.

11. The HDPE composition of claim 10 wherein (b) is present in an amount from about 100 to 750 ppm by weight of said ethylene homopolymer or copolymer and (c) is present in an amount from about 50 to 750 ppm by weight of said ethylene homopolymer or copolymer.

12. The HDPE composition of claim 11 wherein the weight ratio of (b) to (c) is from 3:1 to 1:2.

13. The HDPE composition of claim 11 wherein (c) is present in an amount from 100 to 500 ppm by weight of said ethylene homopolymer or copolymer.

14. The HDPE composition of claim 11 wherein (b) is α-tocopherol or mixture of hindered phenols having α-tocopherol as the major component.

15. The HDPE composition of claim 11 wherein (b) is octadecyl 3,5-di-t-butyl- 4-hydroxyhydrocinnamate or mixture of hindered phenols having octadecyl 3,5-di-t-butyl-4-hydroxyhydrocinnamate as the major component.

16. The HDPE composition of claim 11 wherein (b) is tetrakis[methylene(3,5-di-t-butyl-4-hydroxyhydrocinnamate)]methane or mixture of hindered phenols having tetrakis[methylene(3,5-di-t-butyl- 4-hydroxyhydrocinnamate)]methane as the major component.

17. The HDPE composition of claim 10 wherein (b) is thiodiethylene bis-(3,5-di-t-butyl-4-hydroxy)hydrocinnamate or mixture of hindered phenols having thiodiethylene bis-(3,5-di-t-butyl-4-hydroxy)hydrocinnamate as the major component.

18. The HDPE composition of claim 1 wherein the rate of torque change between the torque$_{max}$ and torque$_{mn}$ when processed for 40 minutes in air at 225° C. and 60 rpm in a Haake Buchler torque rheometer with counter-rotating sigma style rotors is less than 15 meter-grams per minute.

19. The HDPE composition of claim 18 where the rate of torque change is less than 10 meter-grams per minute.

* * * * *